US010436920B2

(12) United States Patent
Yang et al.

(10) Patent No.: US 10,436,920 B2
(45) Date of Patent: Oct. 8, 2019

(54) MONITORING SYSTEM FOR USE IN SEISMIC INSTRUMENT ARRANGEMENT IN PETROLEUM EXPLORATION

(71) Applicants: China National Petroleum Corporation, Beijing (CN); BGP Inc., China National Petroleum Corporation, Hebei (CN)

(72) Inventors: Maojun Yang, Beijing (CN); Fulong Luo, Beijing (CN); Guosheng Li, Beijing (CN); Ying Xia, Beijing (CN); Lei Huang, Beijing (CN); Huadong Sun, Beijing (CN); Weiping Liu, Beijing (CN); Yuan Wang, Beijing (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 374 days.

(21) Appl. No.: 15/159,249

(22) Filed: May 19, 2016

(65) Prior Publication Data

US 2016/0259071 A1    Sep. 8, 2016

Related U.S. Application Data

(63) Continuation of application No. PCT/CN2014/091667, filed on Nov. 19, 2014.

(30) Foreign Application Priority Data

Nov. 19, 2013 (CN) .......................... 2013 1 0585254

(51) Int. Cl.
*G01V 1/42* (2006.01)
*G01V 1/00* (2006.01)

(52) U.S. Cl.
CPC .......... *G01V 1/003* (2013.01); *G01V 2200/14* (2013.01)

(58) Field of Classification Search
CPC ....... G01V 1/00; G01V 1/003; G01V 2200/14
See application file for complete search history.

(56) References Cited

U.S. PATENT DOCUMENTS 4,369,507 A      1/1983   Carruth, Jr.
6,826,483 B1 *  11/2004   Anderson ................ G01V 1/30
                                                                702/13
(Continued)

FOREIGN PATENT DOCUMENTS

CN    202093580 U      6/2011
CN    102230972 A *   11/2011 ............... G01V 1/18
(Continued)

OTHER PUBLICATIONS

Katz—Oil spill response technology initiation decision report to the pollution abatement ashore program (Year: 2007).*

(Continued)

*Primary Examiner* — Isam A Alsomiri
*Assistant Examiner* — Amie M Ndure
(74) *Attorney, Agent, or Firm* — Hamilton, Brook, Smith & Reynolds, P.C.

(57) ABSTRACT

A monitoring system for use in seismic instrument arrangement in petroleum exploration, belonging to the technical field of network transmission of seismic instrument arrangement information, comprises a host server and a hand-held terminal device, wherein the host server is configured to be connected to a host machine of a seismic instrument, manipulated by an instrument operator, can extract the seismic instrument arrangement information, classify field arrangement information based on the corresponding setting and transmit the arrangement information by using a 2G/3G (Continued)

network; the hand-held terminal device can receive the field arrangement information transmitted by the host server, by the 2G/3G network, and alarm and remind line inspection personnel to conduct an arrangement check; after completing the inspection task, the line inspection personnel can send inquiry information via the hand-held terminal device to inquire of the instrument operator about the line inspection condition. The present invention reduces the difficulty of checking an arrangement at the time of the seismic exploration and production, shortens the required time for checking an arrangement and plays an important role in improving a production efficiency of seismic exploration.

3 Claims, 3 Drawing Sheets

(56) References Cited

U.S. PATENT DOCUMENTS

| | | | | |
|---|---|---|---|---|
| 7,224,642 | B1 | 5/2007 | Tran | |
| 2004/0117121 | A1* | 6/2004 | Gray | G01V 1/30 702/11 |
| 2004/0267499 | A1* | 12/2004 | Barnes | G01V 1/288 702/179 |
| 2005/0043892 | A1* | 2/2005 | Lichman | G01V 1/306 702/13 |
| 2006/0004521 | A1* | 1/2006 | Bankhead | G01V 1/28 702/14 |
| 2007/0277115 | A1* | 11/2007 | Glinsky | G01V 1/34 715/771 |
| 2008/0112263 | A1* | 5/2008 | Bergery | G01V 1/28 367/50 |
| 2008/0123469 | A1* | 5/2008 | Wibaux | G01V 1/008 367/38 |
| 2010/0085835 | A1* | 4/2010 | Tang | G01V 1/30 367/32 |
| 2010/0138202 | A1* | 6/2010 | Mallison | E21B 43/00 703/10 |
| 2011/0125476 | A1* | 5/2011 | Craig | E21B 43/16 703/10 |
| 2011/0182144 | A1* | 7/2011 | Gray | G01V 1/30 367/75 |
| 2011/0320129 | A1* | 12/2011 | Hu | G01V 1/28 702/14 |
| 2012/0044784 | A1* | 2/2012 | Pierle | G01V 1/30 367/38 |

FOREIGN PATENT DOCUMENTS

| | | | |
|---|---|---|---|
| CN | 102230972 | A | 11/2011 |
| CN | 102364901 | A | 2/2012 |
| CN | 102466813 | A | 5/2012 |
| CN | 102510473 | A | 6/2012 |
| CN | 102572408 | A | 7/2012 |
| CN | 102917037 | A | 2/2013 |
| CN | 103188624 | A | 7/2013 |
| CN | 103336301 | A | 10/2013 |
| WO | WO 2004/040828 | A2 | 5/2004 |

OTHER PUBLICATIONS

Chase—Development of a Non-Contact Oil Spill Detection System (Year: 2005).*
International Search Report for PCT/CN2014/091667, entitled "Seismic Instrument Arrangement Monitoring System for Use in Petroleum Exploration," dated Feb. 11, 2015.
Wu, H-C., "Wireless Network Monitoring Technology of Cable-Less Stored Seismic Instrument," Journal of Jilin University (Engineering and Technology Edition), 42(5): 1296-1301 (Sep. 2012).
Guidelines for Internet Access by Chinese Government Agencies (vol. 1), Apr. 30, 1999, Editorial Board for Guidelines on Internet Access by Chinese Government Agencies, Guide for Internet Access by Chinese Government Agencies (vol. 1), Beijing, China Procuratorial Work Publishing House, pp. 693-694.
Wang Qiao, et al., "Remote Sensing Monitoring of Ecological Environment Based on Environment No. 1 Satellite," Apr. 30, 2010, Remote Sensing Monitoring Based on Environmental Satellite No. 1, Beijing, Science Tech Publishing House, pp. 653-655, 657, 659.
Wang Youzhao, et al., "Android system development and practice," May 31, 2013, Android system development and practice, Beijing, Publishing House of Tsing-Hua University, p. 258.
Chen Jinying, "Introduction to Communications," Sep. 30, 2013, Introduction to Communication, Beijing, Mechanical Industry Publishing House, pp. 273-274.
Office Action for Chinese Patent Application No. 201310585254.X, entitled "Seismic Instrument Arrangement Monitoring System for Use in Petroleum Exploration," dated Jul. 31, 2017, along with English-language machine translation from EPO.
Search Report for Chinese Patent Application No. 201310585254. X, entitled "Seismic Instrument Arrangement Monitoring System for Use in Petroleum Exploration," dated Jul. 31, 2017, along with English-language machine translation from EPO.
Wu, H., et al., "Wireless Network Monitoring Technology of Cable-Less Stored Seismic Instrument," Journal of Jilin University, 42(5): 1296-1231 (Sep. 2012).
Fulong, L, "Network Bridge and its Application Foreground in Seismic Prospecting Exploration," vol. 23(1), 5 pgs. (2009).

* cited by examiner

US 10,436,920 B2

MONITORING SYSTEM FOR USE IN SEISMIC INSTRUMENT ARRANGEMENT IN PETROLEUM EXPLORATION

RELATED APPLICATIONS

This application is a continuation of International Application No. PCT/CN2014/091667, filed on Nov. 19, 2014, published in Chinese, which claims the benefit of Chinese Application No. 201310585254.X, filed on Nov. 19, 2013. The entire teachings of the above applications are incorporated herein by reference.

FIELD OF THE INVENTION

The present invention relates to a monitoring system for use in seismic instrument arrangement in petroleum exploration, belonging to the technical field of network transmission of seismic instrument arrangement information.

BACKGROUND OF THE INVENTION

The application of the existing 2G/3G mobile network has been very extensive and brings about a great convenience to people's life. However, since there is no corresponding support in terms of software, 2G/3G network signals have not yet been applied in the seismic exploration and production. Especially in the seismic exploration and production, when a large number of instant information needs to be transmitted, an old way of screaming things via radio station is still used, which seriously affects the production efficiency of seismic exploration.

SUMMARY OF THE INVENTION

In order to overcome deficiencies of the prior art, the embodiments of the present invention provide a monitoring system for use in seismic instrument arrangement in petroleum exploration comprising:

a host server and a hand-held terminal device; the host server is configured to be connected to a host machine of a seismic instrument, manipulated by an instrument operator, extract seismic instrument arrangement information, classify field arrangement information based on a corresponding setting and transmit the arrangement information by a 2G/3G network; the hand-held terminal device receives the field arrangement information transmitted by the host server, by the 2G/3G network, and alarms and reminds line inspection personnel to conduct an arrangement check. After completing the inspection task, the line inspection personnel send inquiry information via the hand-held terminal device to inquire of the instrument operator about the line inspection condition.

In the above embodiment, by developing a software on its initiative and reasonably using the 2G/3G network, at the time of the seismic exploration and production, instrument operators and line inspection workers can monitor the seismic arrangement state quickly and accurately, thus greatly reducing the difficulty of checking an arrangement at the time of the seismic exploration and production, shortening the required time for checking the arrangement and playing an important role in improving the production efficiency of the seismic exploration.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

In order to explain more clearly the technical solution in the embodiments of the present invention, the following is a simple introduction to figures used in the description of the embodiments. Obviously, the figures in the following description are only some embodiments of the present invention. Persons skilled in the art can also obtain other figures based on these figures under the premise that no creative effort would be required therefor. In the figures.

DETAILED DESCRIPTION OF THE INVENTION

A description of example embodiments of the invention follows.

Obviously, many amendments and changes made by persons skilled in the art based on the purpose of the present invention belong to the protection scope of the present invention.

Figure 1:
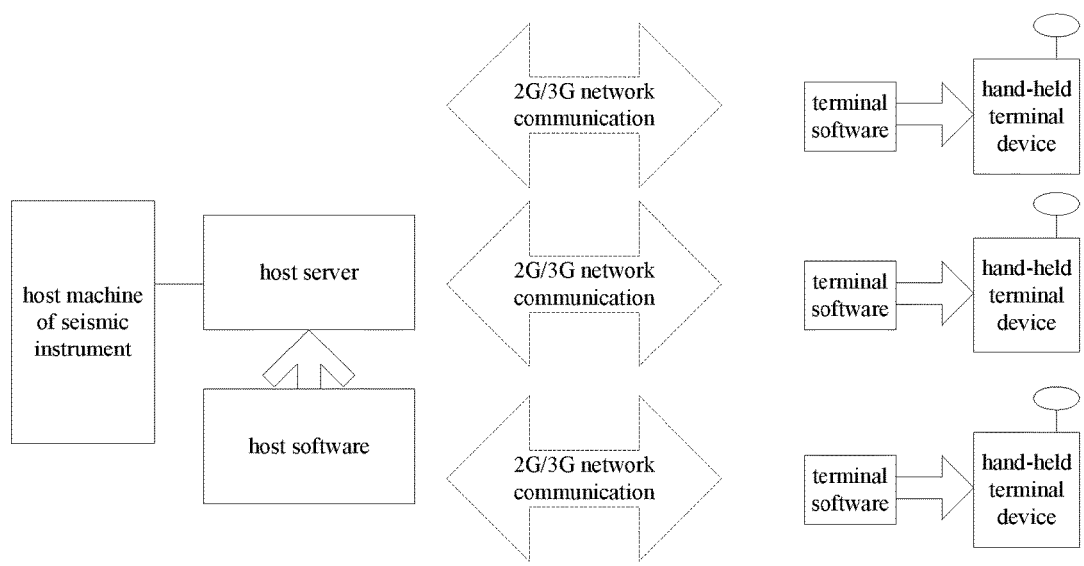
FIG. 1 is a working schematic diagram of a field arrangement monitoring system based on 2G/3G network communication.
Figure 2:
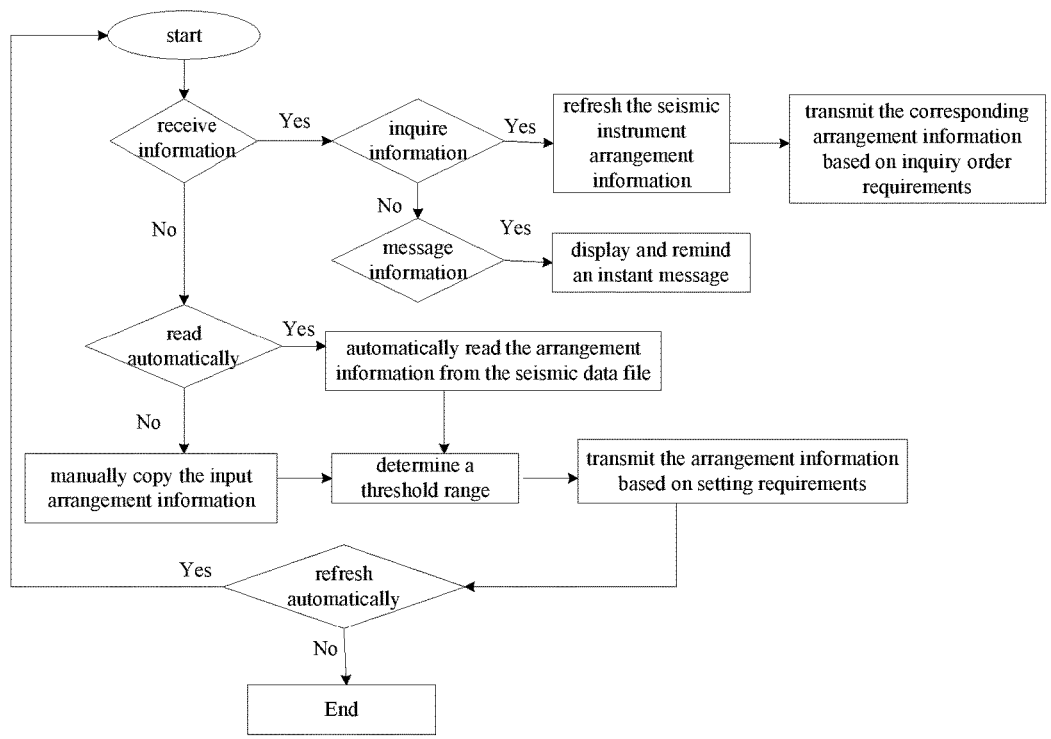
FIG. 2 is a schematic diagram of the working process of the host server software.
Figure 3:
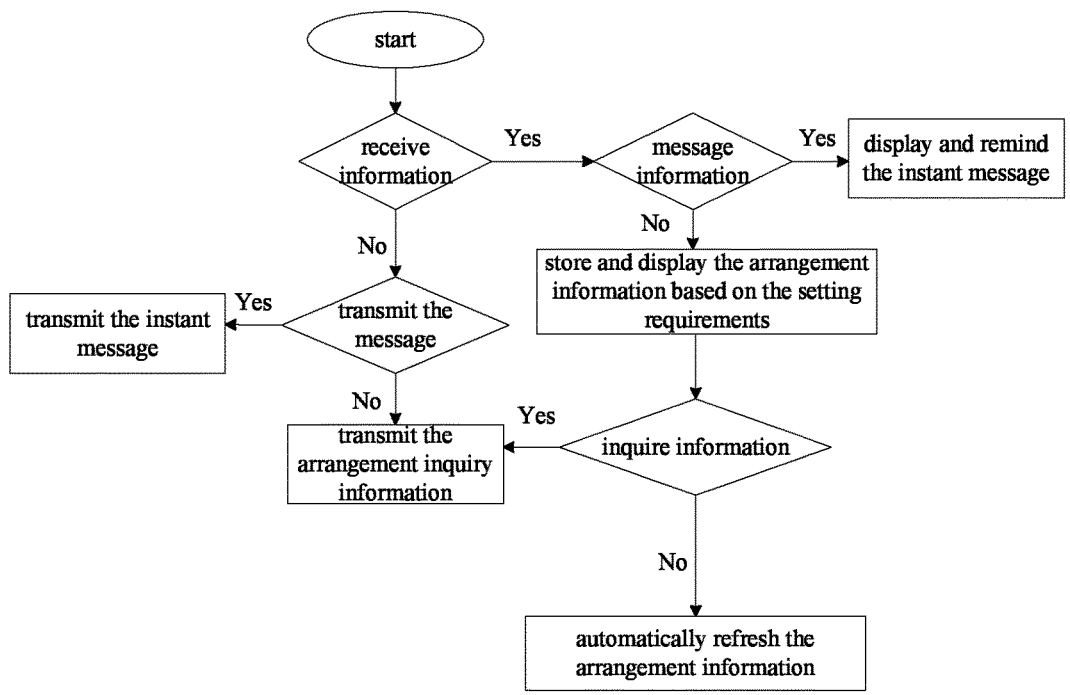
FIG. 3 is a schematic diagram of the working process of the hand-held terminal device software.

Embodiment 1 as shown in FIG. 1, a field arrangement monitoring system based on 2G/3G network communication, as shown in FIGS. 2 and 3, a working flowchart of the host server and the hand-held terminal device, respectively.

By analyzing and summarizing the features of the field monitoring arrangement work in the seismic exploration construction, the inventor has found that the traditional arrangement monitoring method mainly has the following shortcomings: 1. being lack of an effective communication mode and consuming a lot of production time; and 2. being lack of advanced equipment and facilities, transmitting a large amount of information by using the ways of voice broadcast and manual record, which seriously affects the production efficiency. In order to solve the above problems in the construction, the embodiments of the present invention design a field arrangement monitoring system based on 2G/3G network communication applicable in the seismic exploration construction.

As shown in FIG. 1, it is a working schematic diagram of a field arrangement monitoring system based on 2G/3G network communication. The host server software is used to be connected to the host machine of the seismic instrument, obtain the seismic instrument arrangement information or input an instant message, and transmit said information through a 2G/3G network. Meanwhile, the hand-held terminal device can be used to receive the seismic arrangement state information and instant message by installation of a terminal software, and display the arrangement information on the screen based on the setting by the line inspection personnel, and also used to transmit an instant message to the host server or transmit seismic instrument arrangement inquiry information.

As shown in FIG. 2, it is a schematic diagram of the working process of the host server software. After starting running, the software first determines whether it needs to receive information, if the information has been received, it is necessary to determine said information is inquiry information or message information, if it is inquiry information, automatically refreshing the seismic instrument arrangement information and extracting arrangement data based on the inquiry content, and transmitting to the corresponding inquirer; if it is message information, displaying said instant message and giving a warning and reminder. The host server software can obtain the seismic arrangement state information by setting two modes of automatic extraction and manual input, the mode of automatic extraction, at a set certain time interval, obtains the seismic arrangement information from the seismic data file generated by the seismic instrument, the mode of manual input copies the arrangement information into the host server software after the instrument operator tests the arrangement state, the host server software after obtaining the arrangement information will classify and store the seismic instrument arrangement information data according to the preset threshold range and relevant conditions and transmit to the corresponding hand-held terminal device via a 2G/3G network, the host server software will repeatedly refresh the seismic arrangement content at a preset time interval and repeatedly transmit the newest seismic arrangement information to the hand-held terminal device.

As shown in FIG. 3, it is a schematic diagram of the working process of the hand-held terminal device software. At the time of running, the terminal software first determines whether it has received the information from the host server, after receiving the information, it needs to determine the received message is instant message information or seismic arrangement information, if the received information is instant message information, displaying said information and issuing a warning sound to remind, if the received information is seismic instrument arrangement information, it is necessary to store and display the arrangement information based on setting requirements, such information can be automatically refreshed at a time interval. Meanwhile, the line inspection personnel can use the hand-held terminal device to transmit an instant message to the host server or set some specific arrangement inquiry information.

Through the embodiments of the present invention, based on the features of the field arrangement monitoring work, by using the 2G/3G network communication and the corresponding communication equipment, instrument operators and line inspection personnel can realize a large number of information communication accurately and quickly, which has a great significance in improving the production efficiency of the seismic exploration, especially large-scale multichannel seismic exploration projects.

Embodiment 2

In this embodiment, a field arrangement monitoring system based on the 2G/3G network communication comprises:

1) a host server which can obtain the seismic instrument arrangement information through two modes of automatic extraction or manual input, automatically classify and store said information based on setting requirements for threshold, and can also input an instant message and transmit said information to a hand-held terminal device by using the 2G/3G communication network.

2) A hand-held terminal device which can receive the seismic arrangement information or instant message from the host server, display to arrangement inspection personnel and issue a warning sound to remind, the arrangement inspection personnel can transmit the arrangement inquiry content or instant message to the host server through the hand-held terminal device.

In the actual operation, the host server and the hand-held terminal device realize a real-time monitoring of field arrangement by repeating the communication steps of the host server and the hand-held terminal device described above.

The following is detailed descriptions of the host server and the hand-held terminal device described above in the form of module, wherein:

1) a host system comprises: a first software interface unit, a data extraction unit, a data classification storage unit and a first 2G/3G network communication unit, wherein the software interface unit is configured to a seismic instrument operator to set, order the host software and line-check the corresponding state; the data extraction unit is configured to input the seismic instrument arrangement information, can automatically read a seismic instrument data file and can also make an inputting in batch by the seismic instrument operator manually; the data classification storage unit is used to classify and store the extracted seismic data based on the setting by the seismic instrument operator; the 2G/3G network communication unit is configured to receive and send the corresponding information between the host server and the hand-held terminal device by the 2G/3G network.

2) A hand-held terminal device comprises: a second software interface unit, a control unit, a data processing unit and a second 2G/3G network communication unit, wherein the software interface unit is configured to display the corresponding seismic data arrangement content on a data display unit of the hand-held terminal module based on setting requirements; the control unit is configured to control an overall working process of the hand-held terminal module; the data processing unit is configured to modulate and transmit, receive and demodulate, and classify and store data, the second 2G/3G network communication unit is configured to receive and send the corresponding information between the host server and the hand-held terminal device by the 2G/3G network.

As mentioned above, the embodiments of the present invention are described in detail, however, it is obvious for persons skilled in the art that many modifications of the present invention are possible without materially departing from the innovative aspects and effects thereof. Therefore, such modifications are all also included in the protection scope of the present invention.

While this invention has been particularly shown and described with references to example embodiments thereof, it will be understood by those skilled in the art that various changes in form and details may be made therein without departing from the scope of the invention encompassed by the appended claims.

What is claimed is:

1. A monitoring system for use in seismic instrument arrangement in petroleum exploration, the monitoring system comprising:
a host server configured to:
be connected to a host machine of a seismic instrument, manipulated by an instrument operator, used to extract seismic instrument arrangement information; and
classify field arrangement information based on a corresponding setting and transmit the field arrangement information by a 2G/3G network; and
a hand-held terminal device configured to:
receive the field arrangement information transmitted by the host server, by the 2G/3G network;

alarm and remind line inspection personnel to conduct an arrangement check;

be used by the line inspection personnel, after completing the arrangement check, to send inquiry information via the hand-held terminal device to inquire of the instrument operator about a line inspection condition, wherein the host server is further configured to be connected to the host machine of the seismic instrument, obtain the seismic instrument arrangement information or input an instant message, and transmit said seismic instrument arrangement information through the 2G/3G network; and wherein the hand-held device is further configured to receive the seismic instrument arrangement information and instant message by installation of a terminal software, and display the seismic instrument arrangement information on a screen based on a setting by the line inspection personnel, or configured to transmit the instant message to the host server or transmit seismic instrument arrangement inquiry information, wherein the host server is further configured to determine whether it needs to receive information after internal software starts running and, wherein, if said information has been received, the host server is configured to determine whether said information is inquiry information or message information, wherein, if said information is inquiry information, the host server is configured to refresh, automatically, the seismic instrument arrangement information, extract arrangement data based on the inquiry information, and transmit to a corresponding inquirer, and wherein, if said information is message information, the host server is configured to display an instant message and give a warning and reminder, and wherein, software inside the host server is configured to obtain the seismic instrument arrangement information by setting two modes of automatic extraction and manual input, wherein the mode of automatic extraction, at a set certain time interval, causes the seismic instrument arrangement information to be obtained from a seismic data file generated by the seismic instrument, wherein the mode of manual input causes the seismic instrument arrangement information to be copied into the software inside the host server after the instrument operator tests an arrangement state, the software inside the host server is configured to, after obtaining the seismic instrument arrangement information, classify and store the seismic instrument arrangement information according to a preset threshold range and relevant conditions and transmit to a corresponding hand-held terminal device through the 2G/3G network, the software inside the host server is configured to refresh, repeatedly, the seismic instrument arrangement information at a preset time interval and repeatedly transmit newest seismic instrument arrangement information to the hand-held terminal device.

2. The monitoring system for use in seismic instrument arrangement in petroleum exploration according to claim 1, wherein the host server includes:

a first software interface unit;
a data extraction unit;
a data classification storage unit; and
a first 2G/3G network communication unit, wherein the first software interface unit is configured to enable the instrument operator to set, order the host software, and line-check a corresponding state, wherein the data extraction unit is configured to perform at least one of the following operations: inputting the seismic instrument arrangement information, automatically reading a seismic instrument data file and making an inputting in batch by the instrument operator manually, wherein the data classification storage unit is configured to classify and store the extracted seismic data based on a setting by the instrument operator, wherein the first 2G/3G network communication unit is configured to receive and send corresponding information between the host server and the hand-held terminal device by a 2G/3G network, wherein the hand-held terminal device includes:

a second software interface unit;
a control unit;
a data processing unit; and
a second 2G/3G network communication unit, wherein the second software interface unit is configured to display the corresponding seismic data arrangement content on a data display unit of a hand-held terminal module based on setting requirements, wherein the control unit is configured to control an overall working process of the hand-held terminal module, wherein the data processing unit is configured to modulate and transmit, receive and demodulate, and classify and store data, and wherein the second 2G/3G network communication unit is configured to receive and send the corresponding information between the host server and the hand-held terminal device by the 2G/3G network.

3. The monitoring system for use in seismic instrument arrangement in petroleum exploration according to claim 1, wherein:

the software inside the hand-held terminal device at the time of running first is configured to determine whether it has received information from the host server, and after receiving instant information, the software inside the hand-held terminal device is configured to determine whether said information is instant message information or seismic instrument arrangement information, wherein, if the received information is instant message information, the software inside the hand-held terminal device is configured to display said information and issue a warning sound to remind, wherein, if the received information is seismic instrument arrangement information, the software inside the hand-held terminal device is configured to store and display the seismic instrument arrangement information based on setting requirements, wherein the seismic instrument arrangement information is automatically refreshed at the time interval, wherein the hand-held terminal device is configured to enable the line inspection personnel to use the hand-held terminal device to transmit the instant message to the host server or set specific arrangement inquiry information.

* * * * *